United States Patent [19]
Yau et al.

[11] Patent Number: 5,922,400
[45] Date of Patent: Jul. 13, 1999

[54] CORRECTION FLUID

[75] Inventors: Chiou C. Yau, Wrentham; Kim H. Ng, Franklin; Norman G. Sanborn, Weymouth, all of Mass.

[73] Assignee: The Gillette Company, Boston, Mass.

[21] Appl. No.: 08/781,174

[22] Filed: Jan. 9, 1997

[51] Int. Cl.⁶ .................................................. B05D 35/00
[52] U.S. Cl. ...................... 427/140; 427/288; 427/385.5; 427/395; 523/161
[58] Field of Search .................................. 427/140, 288, 427/385.5, 395; 523/161

[56] References Cited

U.S. PATENT DOCUMENTS

| | | | |
|---|---|---|---|
| 2,084,918 | 6/1937 | Nelson | 134/53 |
| 3,356,627 | 12/1967 | Scott | 260/29.6 |
| 3,637,565 | 1/1972 | Sheetz | 260/29.6 TA |
| 3,674,729 | 7/1972 | Mirick | 260/23 AR |
| 3,769,255 | 10/1973 | Sheehan et al. | 260/41 A |
| 3,847,857 | 11/1974 | Haag et al. | 260/29.6 RW |
| 3,875,105 | 4/1975 | Daugherty et al. | 260/33.2 R |
| 3,926,890 | 12/1975 | Huang et al. | 260/29.6 H |
| 3,970,629 | 7/1976 | Izaki et al. | |
| 3,985,663 | 10/1976 | Lu et al. | 252/62.1 L |
| 3,997,498 | 12/1976 | Reese et al. | |
| 4,043,820 | 8/1977 | Landan | 106/21 |
| 4,069,186 | 1/1978 | Ramig | |
| 4,111,878 | 9/1978 | Ruhf | |
| 4,165,988 | 8/1979 | Page et al. | 106/23 |
| 4,228,028 | 10/1980 | Lin | 252/188.3 R |
| 4,248,754 | 2/1981 | Fox et al. | 260/29.6 E |
| 4,290,072 | 9/1981 | Mansukhani | 346/1.1 |
| 4,308,186 | 12/1981 | Schreurs et al. | 260/29.2 EP |
| 4,352,901 | 10/1982 | Maxwell et al. | 524/38 |
| 4,399,254 | 8/1983 | Das et al. | 524/745 |
| 4,507,422 | 3/1985 | Farrar et al. | 524/425 |
| 4,530,954 | 7/1985 | Arpin | 524/387 |
| 4,554,307 | 11/1985 | Farrar et al. | 524/425 |
| 4,654,081 | 3/1987 | Dalzell | 106/23 |
| 4,655,834 | 4/1987 | Haruta et al. | 106/20 |
| 4,687,789 | 8/1987 | Gonnet et al. | 523/122 |
| 4,695,528 | 9/1987 | Dabisch et al. | 430/290 |
| 4,740,549 | 4/1988 | Okuzono et al. | 524/379 |
| 4,833,117 | 5/1989 | Brooks et al. | 503/201 |
| 4,960,828 | 10/1990 | Higuchi et al. | 525/162 |
| 5,026,755 | 6/1991 | Kveglis et al. | 524/389 |
| 5,164,433 | 11/1992 | Ricci et al. | 524/47 |
| 5,199,976 | 4/1993 | Yau et al. | 106/19 A |
| 5,256,191 | 10/1993 | Thompson et al. | 106/19 A |
| 5,332,599 | 7/1994 | Sanborn | |
| 5,338,775 | 8/1994 | Matz et al. | |
| 5,370,922 | 12/1994 | Sanborn et al. | 428/201 |
| 5,500,455 | 3/1996 | Terakawa | 523/161 |
| 5,514,450 | 5/1996 | Sanborn | 525/102 |

FOREIGN PATENT DOCUMENTS

| | | |
|---|---|---|
| 254586 | 3/1988 | Germany . |
| 3919588 | 12/1989 | Germany . |
| 4036625 | 4/1992 | Germany . |
| 58-49761 | 3/1983 | Japan . |
| 59-131675 | 7/1984 | Japan . |
| 9193973 | 11/1984 | Japan . |
| 60-68996 | 4/1985 | Japan . |
| 60-250990 | 12/1985 | Japan . |
| 1174274 | 8/1986 | Japan . |
| 2183845 | 8/1987 | Japan . |
| 2267372 | 11/1987 | Japan . |
| 3099273 | 4/1988 | Japan . |
| 1-254962 | 10/1989 | Japan . |
| 1261473 | 10/1989 | Japan . |
| 1292074 | 11/1989 | Japan . |
| 2-97568 | 4/1990 | Japan . |
| 2-97570 | 4/1990 | Japan . |
| 2-97574 | 4/1990 | Japan . |
| 2129274 | 5/1990 | Japan . |
| 2169678 | 6/1990 | Japan . |
| 2-185577 | 7/1990 | Japan . |
| 2173167 | 7/1990 | Japan . |
| 2-202561 | 8/1990 | Japan . |
| 2199180 | 8/1990 | Japan . |
| 2202561 | 8/1990 | Japan . |
| 2209973 | 8/1990 | Japan . |
| 2263876 | 10/1990 | Japan . |
| 3031375 | 2/1991 | Japan . |
| 5-5071 | 1/1993 | Japan . |
| 8162674 | 9/1993 | Japan . |
| 9024764 | 2/1994 | Japan . |
| 891730 | 12/1981 | U.S.S.R. . |
| 2 058 110 | 7/1980 | United Kingdom . |
| WO 2/07039 | 4/1992 | WIPO . |
| WO 93/24579 | 9/1993 | WIPO . |
| WO 94/29393 | 12/1994 | WIPO . |
| WO 96/01878 | 1/1996 | WIPO . |
| WO 96/23031 | 1/1996 | WIPO . |

OTHER PUBLICATIONS

Alince, "Performance of cationic latex as a wet–en additive," Tappi, 1977, 60:133–136. (no mo.).
Air Products, Polyvinyl Acetate Homopolymer Emulsions For Adhesives, brochure (no date).
Air Products, VINAC XX–210 Emulsion, Material Safety Data Sheet, Sep. 1993.
DuPont, Ti–Pure R–902, Product Description (no date).
DuPont, Ti–Pure R–931, Product Description (no date).
Henkel Corporation, NOPCO NXZ, Product Description (no date).
High Point Chemical Corp., HIPOCHEM CGB, Material Safety Data Sheet, Sep. 9, 1993.
High Point Chemical Corp., HIPOCHEM CGB, Product Description (no date).
Worléecryl, Worléecryl 8721, Product Description (no date).
"Correction fluid for dye–based ink print," Abstract, 18182, Research Disclosure, May, 1979.

*Primary Examiner*—Janyce Bell
*Attorney, Agent, or Firm*—Fish & Richardson P.C.

[57] ABSTRACT

An aqueous correction fluid is provided including an opacifying agent, including a first opacifying pigment selected to provide hiding power and a second opacifying pigment selected to provide suspension redispersability, a cationic film-forming polymer, a nonionic film-forming polymer, and a dispersing agent.

32 Claims, No Drawings

CORRECTION FLUID

BACKGROUND OF THE INVENTION

The invention relates to correction fluids.

Correction fluids are used to obscure markings on paper made by, for example, ink pen, pencil, typewriter, laser printer and photocopiers. In general, correction fluid is applied in liquid form to a marking on a paper surface and is then allowed to dry to form a film. The dried film covers the underlying marking and provides a surface that is capable of receiving a corrective marking.

SUMMARY OF THE INVENTION

The invention features improved correction fluids that include an opacifying agent, a film-forming polymer, and water. Preferred correction fluids have good ability to resist bleed (i.e., diffusion of dye through the correction fluid) when applied to aqueous ink markings, and advantageously low viscosity at a relatively high solids level. In addition, the preferred correction fluids combine good hiding power (i.e., ability to completely conceal an underlying marking), with good resistance to settling of the opacifying agent during storage.

In one aspect, the invention features a correction fluid that includes an opacifying agent, a cationic film-forming polymer, and a nonionic film-forming polymer.

Preferred correction fluids according to this aspect of the invention include one or more of the following features. The correction fluid further includes a dispersing agent, e.g., a cationic quaternary ammonium compound. The components are selected and provided in relative amounts so that the correction fluid has a viscosity of from about 300 to 1400 cps at a solids level of about 52 to about 74%. The nonionic film-forming polymer is a polyvinyl acetate emulsion. The polyvinyl acetate emulsion has a viscosity of from about 900 to 1200 cps at 25° C. The correction fluid includes at least about 2% by weight of the nonionic film-forming polymer, more preferably from about 2 to about 18% by weight. The cationic and nonionic film-forming polymers are provided in a weight ratio of from about 2:1 to about 37:1.

In another aspect, the invention features a correction fluid including an opacifying agent that includes a first grade of titanium dioxide selected to provide hiding power and a second grade of titanium dioxide selected to provide suspension redispersability, a film-forming polymer, and water.

Preferred embodiments of this aspect of the invention include one or more of the following features. The first grade of titanium dioxide component has a median particle size that is greater than the median particle size of the second grade of titanium dioxide component, more preferably 10% greater. The first grade of titanium dioxide component has a median particle size of from about 0.50 $\mu$m to about 0.60 $\mu$m, and the second grade of titanium dioxide component has a median particle size of about 0.35 $\mu$m to about 0.45 $\mu$m. The first grade of titanium dioxide component includes a surface treated with at least about 5% alumina and at least about 8% silica. More preferably the first grade of titanium dioxide component includes a minimum of about 80% $TiO_2$, about 6.4% alumina, and 10.2% silica, and the second grade of titanium dioxide includes a minimum of about 91% $TiO_2$, about 4.3% alumina, and about 1.4% silica. The correction fluid includes at least about 30% by weight of said first grade of titanium dioxide and at least about 14% by weight of said second grade of titanium dioxide. The first grade of titanium dioxide and the second grade of titanium dioxide are provided in a weight ratio of from about 1:1 to 1:4.

In another aspect, the invention feature a method of covering a marking on a paper substrate including applying a film of the above-described correction fluid to the marking and allowing the film of correction fluid to dry.

Other features and advantages of the invention will be apparent from the following description of the preferred embodiments thereof, and from the claims.

DESCRIPTION OF THE PREFERRED EMBODIMENTS

Preferred aqueous correction fluids include an opacifying agent, a cationic film-forming polymer, a nonionic film-forming polymer, and a dispersing agent.

Suitable opacifying agents have adequate hiding power to cover a wide variety of ink, typewritten, and printed markings, and also have good pigment suspension redispersability, i.e., any pigment that falls out of suspension can be readily redispersed by agitating the correction fluid, e.g., by shaking the dispenser holding the correction fluid. Preferred opacifying agents comprise a blend of two grades of titanium dioxide, a first grade having good hiding power, and a second grade having good pigment suspension redispersability. Preferably the two grades of titanium dioxide are surface treated with alumina and silica, more preferably the grade of titanium dioxide having good hiding power includes a surface treated with at least about 8% alumina and at least about 5% silica. The preferred particle size of the titanium dioxide having good hiding power is from about 0.50 $\mu$m to about 0.60 $\mu$m, and of the titanium dioxide having good suspension redisperability is from about 0.35 $\mu$m to about 0.45 $\mu$m. Preferably the particle size of the titanium dioxide having good hiding power is greater than the particle size of the titanium dioxide having good suspension redispersability, more preferably at least 10% greater. This difference in particle size has been found to provide better coverage and better dispersibility of the pigment. More preferably the opacifying agent is a blend of two grades of titanium dioxide available under the tradenames Ti-Pure R-931 and Ti-Pure R-902 from DuPont, Wilmington, Del. Each of these grades of titanium dioxide is a rutile titanium dioxide manufactured by the chloride process. Ti-Pure R-931 titanium dioxide includes a minimum of about 80% $TiO_2$, about 6.4% alumina, and 10.2% silica, has a median particle size of 0.55 microns, and has a pH in an aqueous suspension of about 8.9. Ti-Pure R-902 titanium dioxide includes a minimum of about 91% $TiO_2$, about 4.3% alumina, and about 1.4% silica, has a median particle size of 0.42 microns and has a pH in an aqueous suspension of about 8.1.

A sufficient amount of the first grade of titanium dioxide should be included in the opacifying agent so that an underlying mark on paper is not visible through the correction fluid after the correction fluid has dried, but not so much that the titanium dioxide interferes with the formation of a solid film. A sufficient amount of the second grade of titanium dioxide should be included to achieve complete suspension of the pigment while at the same time maximizing hiding power. The correction fluid will preferably include from about 8 to about 24%, and more preferably about 12 to about 20% by weight, based on the total weight of the composition, of the first grade of titanium-dioxide, and from about 24 to about 40%, and more preferably about 28 to about 36% by weight, based on the total weight of the composition, of the second grade of titanium dioxide. Preferably, the ratio of the first grade to the second grade is from about 1:1 to 1:4.

The cationic film-forming polymer serves as a binder, enabling the correction fluid to effectively bind to a paper substrate and to form a continuous film on the paper substrate upon drying at room temperature. The dried film should be receptive to corrective markings without cracking and flaking off the paper. In addition, the cationic film-forming polymer interacts and binds with anionically charged dye molecules in the ink forming the marking so as to form insoluble complexes. This interaction inhibits diffusion of the dye into the correction fluid during drying (a phenomenon referred to as "bleed"). Preferably, the cationic film-forming polymer has a cationic charge sufficient to form insoluble complexes with most dyes used in commercially available inks. The preferred cationic film-forming polymer is a proprietary polymer sold under the tradename WORLEECRYL 8721, by Worleecryl-Chemie GmbH, Germany. This polymer is preferred as it provides a desirably low viscosity to the correction fluid. WORLEECRYL 8721 polymer is provided in an aqueous emulsion having a 30% solids level, a specific gravity of 1.05 g/cc, and a pH of approximately 5.5. Another suitable polymer, which we believe to be similar in composition to WORLEECRYL 8721 polymer, is available under the tradename WORLEECRYL 7712. WORLEECRYL 7712 polymer contains about 40% acrylic polymer, about 20% isopropanol, and about 40% water. The acrylic polymer is a poly(amino alkyl methacrylate) which comprises a terpolymer of ethyl acrylate, methyl methacrylate, and dimethyl amino ethyl methacrylate (EA/MMA/DMAEMA terpolymer), containing approximately 34% of EA, 37% of MMA and 19% of DMA by weight. DMAEMA is an amine functional acrylic monomer which, when in the terpolymer, is neutralized to a pH of about 5.0, is protonated, and carries a positive charge (i.e., is quaternized).

A sufficient amount of the cationic film-forming polymer should be used to effectively complex most dyes present in markings formed on paper, and to allow the correction fluid to form a continuous, substantially water resistant, film on paper upon drying at or below room temperature. Preferably, the correction fluid includes about 20 to 44%, more preferably about 24 to 40% by weight of the cationic film-forming polymer in a 30% solids emulsion, based on the total weight of the composition. If too little of the cationic film-forming polymer is provided, diffusion of dye into the correction fluid may occur, while if too much is provided the correction fluid may be too viscous and hiding power may be compromised.

Suitable nonionic film-forming polymers are polymeric or resinous materials that are capable of binding to paper and of forming a continuous film at room temperature. Preferred polymers are capable of forming a film that is water resistant. Suitable nonionic film-forming polymers also have a sufficiently low viscosity that the addition of this component decreases the viscosity of the correction fluid at a given solids level. Preferred nonionic film forming polymers in a 55% solids emulsion have a viscosity of from about 900 to 1200 cps at 25° C. Preferably the nonionic film forming polymer is a latex polymer emulsion, more preferably a polyvinyl acetate polymer emulsion. The preferred nonionic film-forming polymers are compatible with the cationic film-forming polymer, i.e., when polymers are mixed together and dried, forming-a continuous, uniform film exhibiting no phase separation. A particularly preferred nonionic film-forming polymer is VINAC XX210 emulsion, available from Air Products and Chemicals, Inc. VINAC XX210 emulsion is a polyvinyl acetate homopolymer emulsion that is nonionically stabilized and is compatible with the cationic film-former. VINAC XX210 has a pH of about 4.5 to 6.0, a Tg of 35° C., and a solids content of about 55%.

The correction fluid preferably includes an amount of the nonionic film-forming polymer that is sufficient to decrease the viscosity of the fluid to a desired degree at a given solids level while maintaining acceptable performance and physical properties of the correction fluid. Preferred levels range from about 2 to about 18%, more preferably about 5 to about 12% by weight of the nonionic film-forming polymer in a 55% solids emulsion based on the total weight of the correction fluid composition.

Suitable dispersing agents are those capable of stabilizing the suspension of the opacifying agent in the correction fluid. Preferred dispersing agents are compatible with the cationic film-former; to this end, preferred dispersing agents are cationic. Preferred dispersing agents include quaternary ammonium compounds and non-ionic dispersing agents. A preferred dispersing agent is commercially available from High Point Chemical Corp., High Point, N.C., under the tradename HIPOCHEM CGB. HIPOCHEM CGB dispersant is a cationic quaternary ammonium compound having a specific gravity of about 1, a density of about 8.34 lbs/gal, and a pH in the range of between 4.5 and 6.5. Preferably the dispersing agent is present in an amount sufficient to achieve complete dispersion of the $TiO_2$, but not so much that the hiding power of the $TiO_2$ is reduced. Preferably the composition includes from about 0.5% to about 2.0% by weight dispersing agent.

Preferred correction fluids also include a sufficient amount of water to make the fluid thin enough to be easily applied to paper, e.g., by a brush or other desired dispenser. The total amount of water required will depend on the viscosity of the correction fluid prior to the addition of water (other than the water present in the emulsion components). Adjustments are made by first measuring the viscosity of the composition at a relatively low water level, and then adding incremental amounts of water until the desired viscosity is obtained. It is preferred that sufficient water be added to provide a viscosity from about 300 to about 1400 cps, and preferably from about 400 to about 1000 cps as measured on a Brookfield Viscometer at 25° C. Too much water will undesirably increase the drying time of the fluid. Preferably, the correction fluid should include about 25 to about 46%, and more preferably 35 to about 42%, water by weight of the total composition (inclusive of the water that is included in the emulsion components). Preferred correction fluids have a solids level of about 52 to about 74%.

The correction fluids may contain other conventional additives. For example, the correction fluids may include a defoaming agent, e.g., NOPCO NXZ, or any other defoaming agent typically used in correction fluids. Such defoaming agents are usually mineral oil derivatives mixed with amorphous silica, and should be added in an amount sufficient to ensure that the correction fluid is de-aerated and does not foam when shaken. Preferred correction fluids include about 0.2 to about 1.5%, and more preferably about 0.3 to about 1.0% of a defoaming agent by weight of the total composition, The correction fluids may also contain one or more cationic, and/or nonionic surfactants to maintain viscosity and shelf-life stability during storage. Antimicrobial agents such as GLYDANT PLUS antimicrobial (available from Lonza Inc.) may also be used to prevent microbial growth in the composition.

The following example illustrates a preferred correction fluid.

EXAMPLE

A correction fluid composition was prepared using the ingredients shown in Table 1.

TABLE 1

| Ingredients | Weight Percent |
| --- | --- |
| 1. Water | 10.72 |
| 2. Glydant Plus (antimicrobial agent) | 0.30 |
| 3. Hipochem CGB (dispersing agent) | 1.03 |
| 4. Worleecryl 8721 (cationic film-forming polymer) | 32.87 |
| 5. Nopco NXZ (defoamer) | 0.48 |
| 6. Tipure R 931 ($TiO_2$) | 15.89 |
| 7. Tipure R 902 ($TiO_2$) | 31.77 |
| 8. Vinac XX210 (nonionic film-former) | 5.97 |
| 9. Harshaw Black, W-7017 | 0.02 |
| 10. Ethanol | 0.95 |
| | 100% |

The correction fluid was prepared by:

1. Adding the specified amount of deionized water into a clean mixing tank equipped with a Cowles type (saw tooth) mixing blade.
2. Turning the mixer on and running it at 400–600 rpm, adjusting the speed to maintain a vortex without excess splashing.
3. Slowly adding the GLYDANT PLUS antimicrobial agent until dissolved (approximately five minutes).
4. Adding the HIPOCHEM CGB dispersant and mixing until dispersed (approximately five minutes).
5. Adding the NOPCO NXZ defoamer and mixing until dispersed throughout the composition (approximately five minutes).
5. Slowly adding the WORLEECRYL 8721 polymer into the vortex and mixing.
6. Slowly adding the TIPURE R-931 $TiO_2$ using a dispersator and allowing each addition of $TiO_2$ to fully disperse before more was added.
7. Slowly adding the TIPURE R-902 $TiO_2$ using a dispersator and allowing each addition of $TiO_2$ to fully disperse before more was added. After the $TiO_2$ was thoroughly dispersed throughout the composition, the composition was mixed for an additional 10 minutes at moderate speed.
8. Placing the composition into a container and adding glass beads to grind the $TiO_2$.
9. Grinding the composition for 60 minutes to decrease the $TiO_2$ particle size by shaking with a paint shaker.
10. Adding ethanol and mixing for approximately five minutes.
11. Adding Harshaw Black and mixing for approximately five minutes.
12. Adding VINAC XX210 polymer and mixing for approximately 10 minutes.
13. Filtering the glass beads out of the composition.
14. Checking the physical properties of the finished fluid to verify that the fluid has the desired viscosity range and percent solids.

The correction fluid was then tested on markings made with water-based ink pens each containing one of the following inks: Uniball black; Pilot Rolling Ball black, blue and red; Pentel Rolling Ball black; Bic Roller black; Waterman Fountain Pen Ink blue; and Parker washable blue ink. The markings were made on International Paper, Hammermill white, 75 g/m² photocopier paper. Each pen was used to form a line of circles on the paper, and the correction fluid was applied at a uniform wet film thickness of 1.5–2.0 mils over the circles using a drawdown bar (Bird Bar). The fluid obscured the underlying markings completely, and no bleed or smudging was observed.

The preferred correction fluids can be used in conventional bottle and brush applicators, as well as other known correction fluid applicators.

Other embodiments are within the claims.

What is claimed is:

1. An aqueous correction fluid, comprising:
   an opacifying agent;
   a cationic film-forming polymer; and
   a nonionic film-forming polymer.

2. The correction fluid of claim 1 further comprising a dispersing agent.

3. The correction fluid of claim 1, wherein said dispersing agent comprises a cationic quaternary ammonium compound.

4. The correction fluid of claim 1, wherein said nonionic film-forming polymer comprises a polyvinyl acetate emulsion.

5. The correction fluid of claim 1 wherein said nonionic film-forming polymer has a viscosity of from about 900 to 1200 cps at 25° C.

6. The correction fluid of claim 1 wherein said cationic film-forming polymer comprises a terpolymer of ethyl acrylate, methyl methacrylate, and dimethyl amino ethyl methacrylate.

7. The correction fluid of claim 1 comprising at least about 28% by weight of said cationic film-forming polymer.

8. The correction fluid of claim 1 comprising from about 20 to 44% of said cationic film-forming polymer.

9. The correction fluid of claim 1 comprising at east about 2% by weight of said nonionic film-forming polymer.

10. The correction fluid of claim 1 comprising from about 2 to 18% of said nonionic film-forming polymer.

11. The correction fluid of claim 1 wherein said cationic and nonionic film-forming polymers are provided in a weight ratio of from about 2:1 to about 37:1.

12. The correction fluid of claim 1 wherein said components are selected and provided in relative amounts so that the correction fluid has a viscosity of from about 300 to 1400 cps at a solids level of about 52 to about 74%.

13. An aqueous correction fluid, comprising:
   an opacifying agent comprising a first grade of titanium dioxide that provides hiding power and a second grade of titanium dioxide that provides suspension redispersability;
   a film-forming polymer; and
   water.

14. The correction fluid of claim 13, wherein said first grade of titanium dioxide component has a median particle size that is greater than the median particle size of said second grade of titanium dioxide component.

15. The correction fluid of claim 13, wherein said first grade of titanium dioxide component has a median particle size of from about 0.50 μm to 0.60 μm.

16. The correction fluid of claim 13, wherein said second grade of titanium dioxide component has a median particle size of from about 0.35 μm to about 0.45 μm.

17. The correction fluid of claim 13, wherein said first grade of titanium dioxide component comprises a surface treated with at least about 5% alumina and at least about 8% silica.

18. The correction fluid of claim 13, wherein said first grade of titanium dioxide component has a particle size that is 10% greater than the particle size of said second grade of titanium dioxide component.

19. The correction fluid of claim 13, wherein said first grade of titanium dioxide component comprises a minimum of about 80% $TiO_2$, about 6.4% alumina, and about 10.2% silica.

20. The correction fluid of claim 13, wherein said second grade of titanium dioxide comprises a minimum of about 91% $TiO_2$, about 4.3% alumina, and about 1.4% silica.

21. The correction fluid of claim 13 comprising at least about 30% by weight of said first grade of titanium dioxide.

22. The correction fluid of claim 13 comprising at least about 14% by weight of said second grade of titanium dioxide.

23. The correction fluid of claim 13, wherein said first grade of titanium dioxide and said second grade of titanium dioxide are provided in a weight ratio of from about 1:1 to 1:4.

24. The correction fluid of claim 13 further comprising a dispersing agent.

25. The correction fluid of claim 24, wherein said dispersing agent comprises a cationic quaternary ammonium compound.

26. The correction fluid of claim 13, further comprising a nonionic film-forming polymer.

27. The correction fluid of claim 26 wherein said nonionic film-forming polymer has a viscosity of from about 900 to about 1200 cps at 25° C.

28. The correction fluid of claim 26 further comprising a cationic film-forming polymer.

29. The correction fluid of claim 26 comprising at least about 28% by weight of said cationic film-forming polymer.

30. The correction fluid of claim 26 comprising at least about 2% by weight of said nonionic film-forming polymer.

31. The correction fluid of claim 30 wherein said cationic and nonionic film-forming polymers are provided in a weight ratio of from about 2:1 to about 37:1.

32. A method of covering a marking on a paper substrate comprising:

proviting a correction fluid comprising an opacifying agent, a cationic film-forming polymer, and a nonionic film-forming polymer, applying a film of the correction fluid to the marking, and allowing the film of correction fluid to dry.

* * * * *